(12) United States Patent
Whitmarsh et al.

(10) Patent No.: US 7,239,408 B1
(45) Date of Patent: Jul. 3, 2007

(54) PRINT PROCESSING SYSTEM AND METHOD WITH DOCUMENT ADVISOR SERVICE

(75) Inventors: Michael Dean Whitmarsh, Vancouver, WA (US); William Hertling, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 834 days.

(21) Appl. No.: 09/710,287

(22) Filed: Nov. 10, 2000

(51) Int. Cl.
*G06F 15/00* (2006.01)
*G06K 1/00* (2006.01)

(52) U.S. Cl. ...................... 358/1.15; 358/1.15; 358/1.9

(58) Field of Classification Search .................. 358/1.9, 358/1.1, 1.11–1.18; 705/8, 400
See application file for complete search history.

(56) References Cited

U.S. PATENT DOCUMENTS

| | | | |
|---|---|---|---|
| 4,754,428 A * | 6/1988 | Schultz et al. .............. | 709/246 |
| 4,765,763 A | 8/1988 | Ishikawa | |
| 5,493,415 A | 2/1996 | Mita et al. | |
| 5,875,441 A * | 2/1999 | Nakatsuyama ................. | 707/1 |
| 5,897,260 A | 4/1999 | Zingher | |
| 6,052,479 A | 4/2000 | Hiraishi et al. | |
| 6,330,542 B1 * | 12/2001 | Sevcik et al. .................. | 705/8 |
| 6,473,760 B1 * | 10/2002 | Klatt et al. .................... | 707/10 |
| 2003/0140315 A1 * | 7/2003 | Blumberg et al. .......... | 715/527 |

FOREIGN PATENT DOCUMENTS

| | | |
|---|---|---|
| JP | 09198354 | 7/1997 |
| JP | 09265382 | 10/1997 |
| JP | 11133583 | 5/1999 |
| JP | 11296324 A | 10/1999 |
| JP | 2000081959 A | 3/2000 |
| JP | 2000105678 | 4/2000 |
| JP | 2000148859 | 5/2000 |
| JP | 2000155666 A | 6/2000 |
| WO | WO 9938068 A1 * | 7/1999 |

* cited by examiner

*Primary Examiner*—Gabriel Garcia
*Assistant Examiner*—Thierry L. Pham

(57) ABSTRACT

A system and method of processing a print job of a customer before submitting the print job to at least one of a plurality of print providers includes defining a network communication link between the customer and a print processing system controller. The print processing system controller receives a data file for the print job from the customer via the network communication link and processes the data file to determine at least one document type for the print job.

34 Claims, 11 Drawing Sheets

DOCUMENT TYPE:
- ◉ NEWSLETTER —611
- ○ REPORT —612
- ○ PRESENTATION —613
- ○ DATA SHEET —614
- ○ OTHER... —615

61 →

NUMBER OF COPIES: [ 50 ▲▼ ]
621

62 →

QUALITY:
- ○ VERY IMPORTANT —631
- ◉ SOMEWHAT IMPORTANT —632
- ○ NOT IMPORTANT —633

63 →

COST:
- ○ VERY IMPORTANT —641
- ◉ SOMEWHAT IMPORTANT —642
- ○ NOT IMPORTANT —643

64 →

DUE DATE:
- ◉ VERY IMPORTANT —651
- ○ SOMEWHAT IMPORTANT —652
- ○ NOT IMPORTANT —653

65 →

CUSTOMER INTERFACE

*Fig. 4*

| DOCUMENT TYPE | —71 |
| NUMBER OF COPIES | —72 |
| QUALITY | —73 |
| COST | —74 |
| DUE DATE | —75 |

PRINT REQUEST

*Fig. 5*

| | | | |
|---|---|---|---|
| PRINT MEDIUM SIZE: *161* | ◉ LETTER<br>○ LEGAL<br>○ A4<br>⋮ | FINISHING OPTION: *165* | ○ NONE<br>○ 3-HOLE PUNCH<br>◉ STAPLED<br>○ SIDESTICH<br>○ SPIRAL BOUND<br>○ FOLD<br>⋮<br>○ COVER |
| PRINT MEDIUM TYPE: *162* | ◉ PLAIN<br>○ GLOSS<br>○ BOND<br>⋮ | | |
| PRINTING LAYOUT: *163* | ◉ PORTRAIT<br>○ LANDSCAPE<br>○ SINGLE SIDED<br>◉ TWO SIDED | DELIVERY OPTION: *166* | ○ PICK-UP<br>○ STANDARD<br>◉ EXPRESS<br>⋮ |
| COLOR PRINTING OPTION: *164* | ○ COLOR<br>○ GRAYSCALE<br>◉ MONOCHROME | DUE DATE: *167* | MM/DD/YY |

CUSTOMER INTERFACE

*Fig. 6*

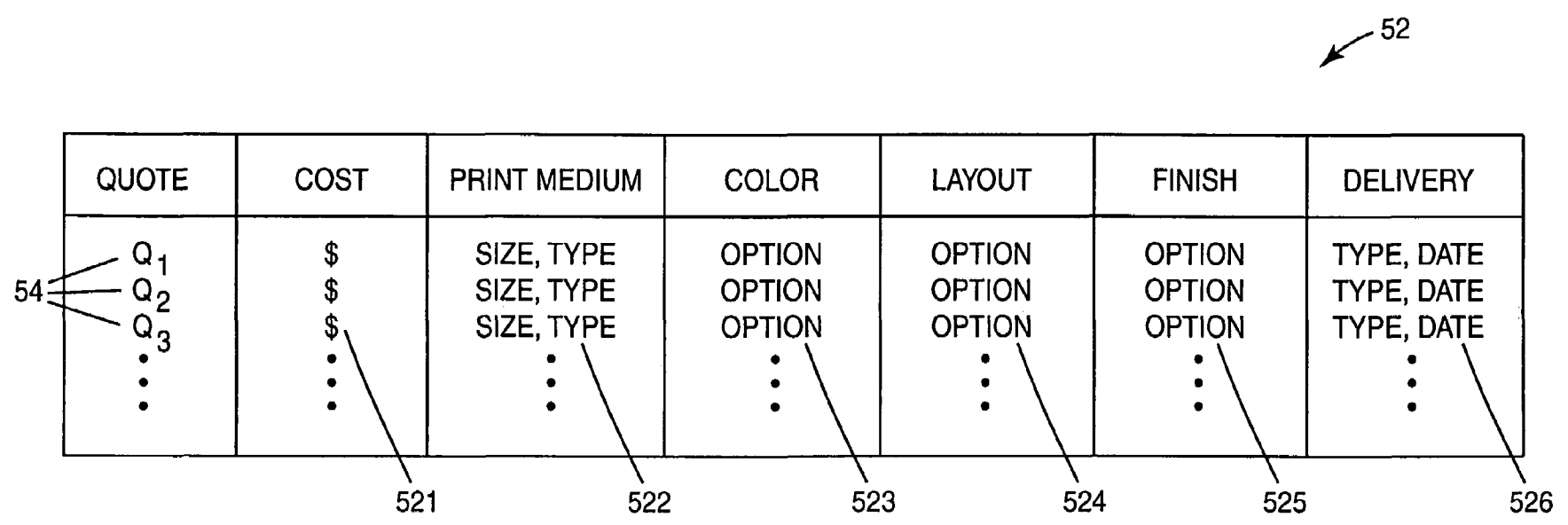

| QUOTE | COST | PRINT MEDIUM | COLOR | LAYOUT | FINISH | DELIVERY |
|---|---|---|---|---|---|---|
| $Q_1$ | $ | SIZE, TYPE | OPTION | OPTION | OPTION | TYPE, DATE |
| $Q_2$ | $ | SIZE, TYPE | OPTION | OPTION | OPTION | TYPE, DATE |
| $Q_3$ | $ | SIZE, TYPE | OPTION | OPTION | OPTION | TYPE, DATE |
| ... | ... | ... | ... | ... | ... | ... |

*Fig. 9*

PRINT PROCESSING SYSTEM AND METHOD WITH DOCUMENT ADVISOR SERVICE

THE FIELD OF THE INVENTION

The present invention relates generally to print services and, more particularly, to a network system and method of processing a print job of a customer before submitting the print job to a print provider.

BACKGROUND OF THE INVENTION

Typically, a party preparing a document to be printed is often concerned with specific goals and/or restrictions for the document. The party, for example, may have specific quality, cost, and/or timeliness goals or restrictions for the document. Thus, the party attempts to create the document in consideration of such goals or restrictions.

Unfortunately, when a party prepares a document, the party may not be aware of all possible options for creating and/or printing of the document. As such, the party may overlook viable options for the document or may unknowingly introduce inefficient constraints into the document. Thus, a party having specific goals or restrictions for a document may not be aware of how to create and print the document so as to best fulfill such goals or restrictions.

Accordingly, a need exists for processing a print job of a customer before submitting the print job to a print provider. More particularly, a need exists for presenting and exploring options available to the customer for the print job while the customer is preparing the print job.

SUMMARY OF THE INVENTION

One aspect of the present invention provides a method of processing a print job of a customer before submitting the print job to at least one of a plurality of print providers. The method includes providing a print processing system controller having a printing capability of the print providers registered therewith, defining a network communication link between the customer and the print processing system controller, receiving a data file for the print job at the print processing system controller via the network communication link, and determining at least one document type for the print job via the print processing system controller. The step of determining the at least one document type for the print job includes processing the data file for the print job to determine the at least one document type for the print job.

Another aspect of the present invention provides a system for processing a print job of a customer before submitting the print job to at least one of a plurality of print providers. The system includes a print processing system controller configured to have a printing capability of the print providers registered therewith. As such, the print processing system controller is adapted to receive a data file for the print job from the customer and process the data file for the print job to determine at least one document type for the print job.

In one embodiment, the present invention provides a system and method of processing a print job for a customer before submitting the print job to a print provider. The system and method utilizes a network communication link between the customer and a controller of the system to efficiently present and explore options available to the customer for the print job while the customer is preparing the print job.

BRIEF DESCRIPTION OF THE DRAWINGS

FIG. 4 is a diagram illustrating one exemplary embodiment of a portion of a customer interface of the print processing system of FIG. 1.

FIG. 5 is a diagram illustrating one exemplary embodiment of a print request generated and submitted by a customer with the print processing system of FIG. 1.

FIG. 6 is a diagram illustrating one exemplary embodiment of another portion of the customer interface of the print processing system of FIG. 1.

FIG. 9 is a diagram illustrating one exemplary embodiment of a list of quotes of print providers compiled by the print processing system of FIG. 1.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
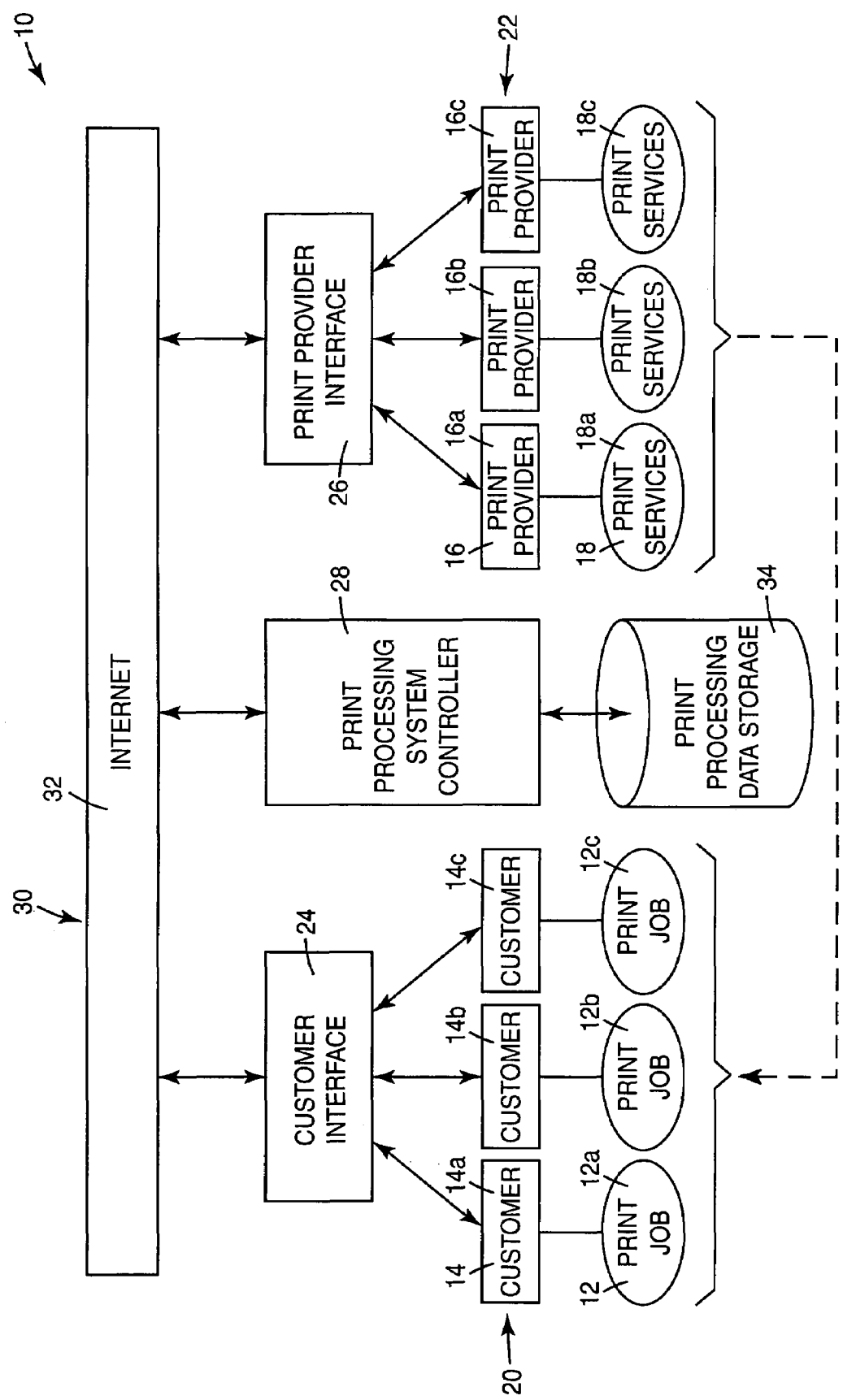
FIG. 1 is a block diagram illustrating one exemplary embodiment of a network print processing system according to the present invention.

A network print processing system according to the present invention is illustrated generally at 10 in FIG. 1. Print processing system 10 facilitates processing of a print job 12 of a customer 14 before printing of print job 12 by a print provider 16 offering print services 18. In particular, print processing system 10 facilitates processing of a print job 12a, 12b, 12c of a customer 14a, 14b, 14c before printing of print job 12a, 12b, 12c by a print provider 16a, 16b, 16c offering print services 18a, 18b, 18c. For clarity, print job 12a, 12b, 12c, customer 14a, 14b, 14c, print provider 16a, 16b, 16c, and print services 18a, 18b, 18c are referred to hereinafter as print job 12, customer 14, print provider 16, and print services 18, respectively. As such, customer 14 may be one of a plurality of customers 20 each having a separate print job 12. Print provider 16 may be one of a plurality of print providers 22 each providing separate print services 18. Accordingly, print processing system 10 assists customer 14 in preparing print job 12.

Print job 12, as used herein, is defined to include a piece of work requiring production and/or reproduction of printed matter. Customer 14, as used herein, is defined to include an entity or entities such as a consumer, an employee, or another print provider requesting or soliciting printing services, finishing services, delivery services, and/or other print processing services. Customer 14, therefore, includes any user of such printing, finishing, delivery, and/or other print processing services. Print provider 16, as used herein, is defined to include an entity or entities offering, providing, and/or assisting in printing services, finishing services, delivery services, and/or other print processing services. Print services 18, as used herein, is defined to include printing services, finishing services, delivery services, and/ or other print processing services.

In one exemplary embodiment, print processing system 10 includes a customer interface 24, a print provider interface 26, and a print processing system controller 28. As such, customers 20 interact with customer interface 24 and print providers 22 interact with print provider interface 26. It is within the scope of the present invention for multiple customers 20 to each use the same customer interface 24 and/or for each customer 14 to have their own customer interface 24. In addition, multiple print providers 22 may each use the same print provider interface 26 and/or each print provider 16 may have their own print provider interface 26.

Customer interface 24, print provider interface 26, and print processing system controller 28 communicate with each other via a network communication link 30. Network communication link 30, as used herein, is defined to include an internet communication link such as an Internet communication link, an intranet communication link, or similar high-speed communication link. In one preferred embodiment, network communication link 30 includes an Internet communication link 32. While the following description only refers to Internet communication link 32, it is understood that the use of other network communication links is within the scope of the present invention. In addition, network communication link 30 may include a wireless communication link.

In one exemplary embodiment, customers 20, print providers 22, and print processing system controller 28 are all located remote from each other (i.e., at different locations). Thus, communications between customers 20 and print processing system controller 28, communications between print providers 22 and print processing system controller 28, and communications between customers 20 and print providers 22 are conducted over Internet communication link 32. Preferably, print providers 22 communicate with print processing system controller 28 via Internet communication link 32. It is, however, within the scope of the present invention for print providers 22 to communicate with print processing system controller 28 in other manners (e.g., a direct connection or communication link).

Print processing system 10, including print processing system controller 28, can be implemented in hardware via a microprocessor, programmable logic device, or state machine, in firmware, or in software within a given device. In one embodiment, at least a portion of the software programming is written in JAVA programming language, and each of the main components communicate via Internet communication link 32 using a communication bus protocol. For example, the present invention may or may not use a TCP/IP protocol suite for data transport. Other programming languages and communication bus protocols suitable for use with print processing system 10 will become apparent to those skilled in the art after reading the present application.

Print processing system controller 28 includes hardware, software, firmware, or a combination of these. In one preferred embodiment, print processing system controller 28 includes a computer server or other microprocessor based system capable of performing a sequence of logic operations. In addition, print processing system controller 28 can include a microprocessor embedded system/appliance incorporating tailored appliance hardware and/or dedicated single purpose hardware.

In one exemplary embodiment, print processing system 10 includes a print processing data storage system 34. Print processing data storage system 34 constitutes a database of one or more data files for print processing system 10. Examples of print processing data storage system 34 include non-volatile memory (e.g., a hard disk drive or other persistent storage device) and may include volatile memory (e.g., random access memory (RAM)). Another example of print processing data storage system 34 may include a relational data base management server (RDBMS). Data is transferred to and from print processing data storage system 34 via print processing system controller 28. It is understood that print processing system controller 28 and print processing data storage system 34 may constitute a central print processing system.

Figure 2:
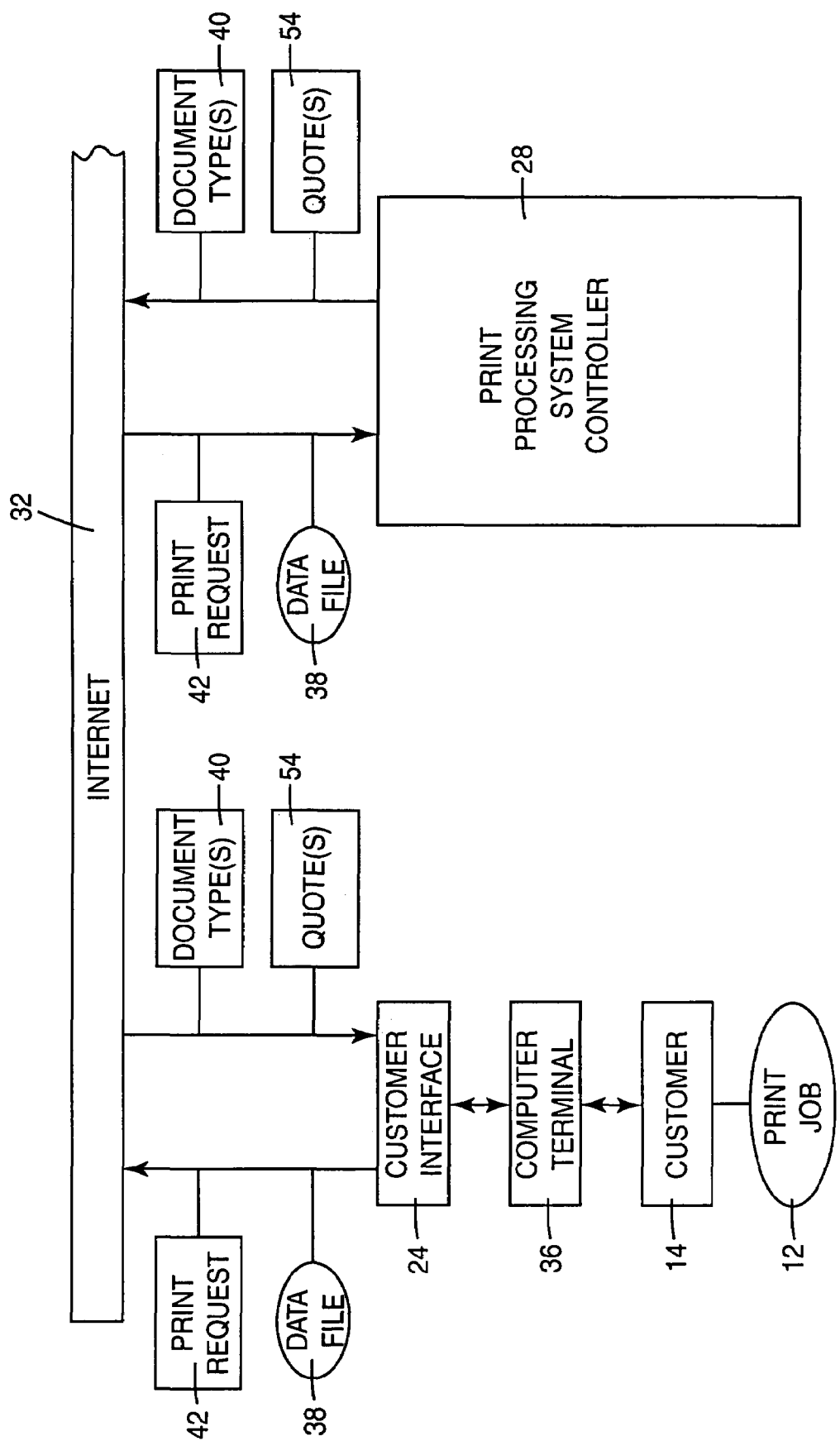
FIG. 2 is a block diagram illustrating one exemplary embodiment of information flow through a portion of the print processing system of FIG. 1.

As illustrated in FIG. 2, customer 14 accesses customer interface 24 of print processing system 10 via a computer terminal 36. Computer terminal 36 may include, for example, an input device such as a keyboard and/or a mouse and a display device such as a monitor, as is well known in the art. In one exemplary embodiment, computer terminal 36 runs an operating system which can support one or more applications. The operating system is stored in memory and executes on a processor. The operating system is preferably a multi-tasking operating system which allows simultaneous execution of multiple applications, although aspects of this invention may be implemented using a single-tasking operating system. In one exemplary embodiment, customer 14 enters print processing system 10 and, therefore, accesses customer interface 24 by selecting "File/Print . . . " in a program running on computer terminal 36 and by selecting print processing system 10, or an application incorporating print processing system 10, as the "Name" of the printer.

Customer 14 interacts with customer interface 24 via computer terminal 36 to submit a data file 38 for print job 12 to print processing system controller 28 via Internet communication link 32. As such, print processing system controller 28 processes data file 38 and determines at least one document type 40 for print job 12 based on data file 38. In one exemplary embodiment, print processing system controller 28 determines a set of document types 40 for print job 12 and presents document types 40 to customer 14. In one exemplary embodiment, document types 40 are reported to customer 14 via Internet communication link 32 and customer interface 24. As such, customer 14 selects a document type for print job 12 from the set of document types 40, as described below. It is understood that the set of document types 40 presented to customer 14 may include one or more document types 40 depending on data file 38 submitted by customer 14.

To determine document type 40 of print job 12, print processing system controller 28 analyzes characteristics of print job 12 and, more specifically, data file 38. Such characteristics include, for example, a file format, a number of pages, a print medium size, a print medium type, a printing layout, a color content, and/or an image presence of print job 12. Based on the analysis of characteristics of print job 12, print processing system controller 28 determines document type 40 of print job 12. A print medium size of 2-inch by 3.5-inch, for example, may indicate document type 40 of print job 12 as being a business card. In addition, a printing layout of "Landscape" may indicate document type 40 of print job 12 as being a presentation.

In one exemplary embodiment, print processing system controller 28 considers expert and/or affinity information on print services 18 and print jobs 12 when determining document type 40 of print job 12. Expert information includes, for example, information relating characteristics and document types of print jobs as recommended and/or suggested by print providers 22. Affinity information includes, for example, information relating characteristics and document types of other print jobs of customers 20 as processed by print processing system controller 28, including other print jobs of customer 14.

Customer 14 also interacts with customer interface 24 via computer terminal 36 to generate a print request 42 for print job 12 and submit print request 42 to print processing system controller 28 via Internet communication link 32. Print request 42 identifies attributes of print job 12 specified by customer 14, including a selection of document type 40 for print job 12, as described below.

Figure 3:
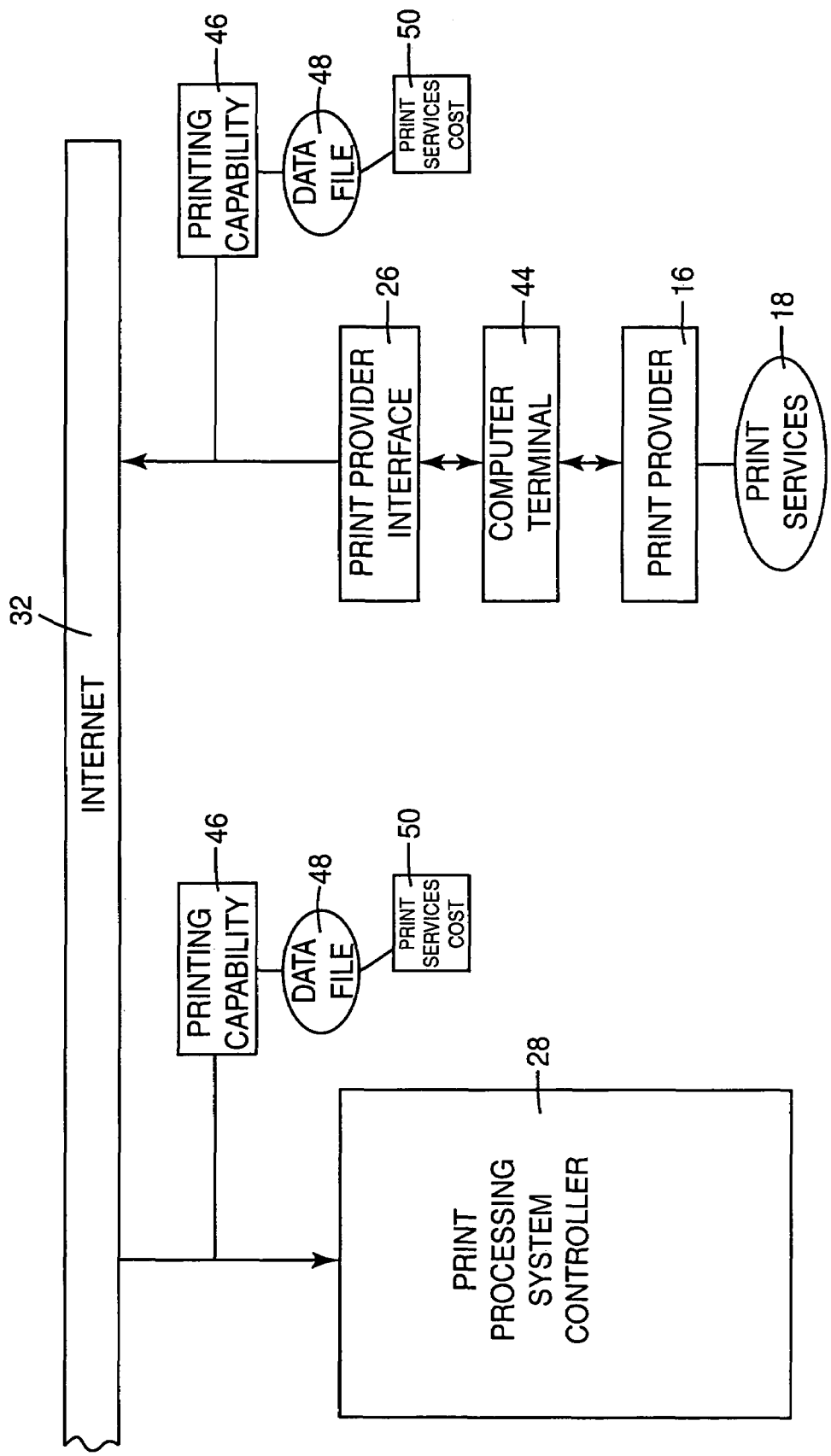
FIG. 3 is a block diagram illustrating one exemplary embodiment of information flow through another portion of the print processing system of FIG. 1.

As illustrated in FIG. 3, print provider 16 accesses print provider interface 26 of print processing system 10 via a computer terminal 44. Computer terminal 44 may include, for example, an input device such as a keyboard and/or a mouse and a display device such as a monitor, as is well known in the art and may run an operating system which can support one or more applications, similar to that described above with regards to computer terminal 34. Print provider 16 interacts with print provider interface 26 via computer terminal 44 to register a printing capability 46 with print processing system controller 28 via Internet communication link 32. Printing capability 46 identifies attributes of print services 18 as provided by print provider 16.

In one exemplary embodiment, print processing system controller 28 communicates with and transfers printing capability 46 of print providers 22 to print processing data storage system 34 (FIG. 1). As such, print processing data storage system 34 stores printing capability 46 of print providers 22 for subsequent retrieval and processing. More specifically, when print processing system controller 28 receives printing capability 46 from print provider 16, printing capability 46 is stored as a data file in print processing data storage system 34. Print processing system controller 28, therefore, subsequently retrieves printing capability 46 from print processing data storage system 34 for processing.

In one exemplary embodiment, a data file 48 for print services 18 is associated with printing capability 46. Thus, data file 48 for print services 18 is registered with printing capability 46 and uploaded to print processing system controller 28 via Internet communication link 32. As such, print processing system controller 28 stores data file 48 for print services 18 in print processing data storage system 34 (FIG. 1) for subsequent processing. Data file 48 includes operational parameters of print services 18 provided by print provider 16.

In one exemplary embodiment, data file 48 for print services 18 includes a print services cost 50 for print services 18 provided by print provider 16. Print services cost 50 includes, for example, a cost of equipment, materials and supplies, labor, and other resources necessary for providing print services 18. As such, data file 48 includes an operational cost of equipment such as printing equipment, finishing equipment, and other processing equipment included in print services 18, a unit cost of materials and supplies such as print medium and marking material included in print services 18, a cost of finishing services included in print services 18, a cost of delivery services included in print services 18, and other costs included in and associated with print services 18. Thus, data file 48 includes costs for various options of materials and supplies, finishing services, and/or delivery services included in print services 18. Marking material, as used herein, is defined to include ink and/or toner used by printing equipment of print services 18.

In one exemplary embodiment, as illustrated in FIG. 4, a portion of customer interface 24 includes a plurality of input fields 60 with which customer 14 interacts to specify attributes of print job 12. As such, customer 14 interacts with input fields 60, via an input device such as a keyboard and/or a mouse of computer terminal 36, to generate print request 42 for print job 12. Input fields 60 include, for example, a document type field 61, a number of copies field 62, a quality field 63, a cost field 64, and a due date field 65.

Input fields 60 each include at least one subfield providing data entry points or representing available options for generating and submitting print request 42. Document type field 61 includes, for example, subfields 611, 612, 613, 614, and 615 which represent different document types 40 for print job 12 as determined by print processing system controller 28. Subfields 611, 612, 613, 614, and 615, therefore, vary per print job 12. Number of copies field 62 includes a subfield 621 in which a number of copies included in print job 12 is specified. Quality field 63, cost field 64, and due date field 65, include, for example, subfields 631, 632, and 633, 641, 642, and 643, and 651, 652, and 653, respectfully, which represent characteristics of a quality, a cost, and a due date, respectfully, of print job 12. Quality of print job 12 is influenced, for example, by a print medium, a print resolution, color printing, finishing options, and/or a type of equipment used to print job 12.

Customer 14 selects document type 40 for print job 12 from document type field 61, specifies the number of copies included in print job 12 in number of copies field 62, and selects quality, cost, and due date characteristics for print job 12 from quality field 63, cost field 64, and due date field 65, respectively. Selecting various subfields of input fields 60, therefore, identifies attributes of print job 12 as specified by customer 14 and identifies relative characteristics of print job 12. In one exemplary embodiment, quality field 63, cost field 64, and due date field 65 represent different importance levels of quality, cost, and due date, respectively, of print job 12 to customer 14. It is, however, within the scope of the present invention for quality field 63, cost field 64, and/or due date field 65 to represent a specific value such as a specific price or a specific due date, a range such as a range of prices, and/or a maximum value or a minimum value such as a maximum price or a due by date.

By interacting with customer interface 24, customer 14 generates print request 42. In one exemplary embodiment, as illustrated in FIG. 5, print request 42 includes a plurality of print request attributes 70 which define print job 12. Print request attributes 70 include, for example, a document type attribute 71, a number of copies attribute 72, a quality attribute 73, a cost attribute 74, and a due date attribute 75. Print request attributes 70 coincide with selections as specified in input fields 60 of customer interface 24. As such, print request attributes 70 are conveyed to print processing system controller 28 from customer interface 24. In one exemplary embodiment, quality attribute 73, cost attribute 74, and due date attribute 75 represent a quality importance, a cost importance, and a due date importance of print job 12 to customer 14.

In one exemplary embodiment, as illustrated in FIG. 6, another portion of customer interface 24 includes a plurality of advanced input fields 160 with which customer 14 can choose to interact and specify additional attributes of print job 12. As such, customer 14 can choose to interact with advanced input fields 160, via an input device such as a keyboard and/or a mouse of computer terminal 36, and further define print request 42 for print job 12. Advanced input fields 160 include, for example, a print medium size field 161, a print medium type field 162, a printing layout field 163, a color printing option field 164, a finishing option field 165, a delivery option field 166, and a due date field 167.

Advanced input fields 160 each include at least one subfield providing data entry points or representing available options for generating and submitting print request 42. Print medium size field 161 includes subfields which represent different sizes of print medium for print job 12. Print medium type field 162 includes subfields which represent different types of print medium for print job 12. Printing layout field 163 includes subfields which represent different printing layouts for print job 12. Color printing option field 164 includes subfields which represent different color printing options for print job 12. Finishing option field 165 includes subfields which represent different finishing options for print job 12. Delivery option field 166 includes subfields which represent different delivery options for print job 12. Due date field 167 includes a subfield in which a due date for print job 12 can be specified.

Additional print medium sizes, print medium types, printing layouts, color printing options, finishing options, and delivery options, as are well known in the art, may be represented by additional subfields of print medium size field 161, print medium type field 162, printing layout field 163, color printing option field 164, finishing option field 165, and delivery option field 166, respectively. Selecting and/or completing various subfields of input fields 160, therefore, identifies attributes of print job 12 as specified by customer 14.

In one exemplary embodiment, input of specific input fields 160 dictates a selection of other input fields 160. When customer 14 selects a specific subfield, for example, additional subfields may appear and/or existing subfields may be unavailable. For example, if customer 14 selects "Cover" of finishing option field 165, additional subfields appear representing different cover options. In addition, when customer 14 selects a specific subfield, additional subfields may be automatically selected and/or completed.

In one exemplary embodiment, print processing system controller 28 automatically selects specific subfields or options of advanced input fields 160. Specific subfields or options of advanced input fields 160 are initially selected based on document type attribute 71, as selected by customer 14, quality attribute 73, cost attribute 74, and/or due date attribute 75, as specified by customer 14. As such, advanced input fields 160 are selected based on print request attributes 70 of print job 12 in view of expert and/or affinity information, as described above.

In one illustrative embodiment, based on document type attribute 71 as being "Newsletter", quality attribute 73, cost attribute 74, and due date attribute 75 as being "Somewhat Important", "Somewhat Important", and "Very Important", respectively, and expert and/or affinity information, print processing system controller 28 automatically selects a print medium size of "Letter", a print medium type of "Plain Paper", a printing layout option of "Portrait", a printing layout option of "Two-Sided", a color printing option of "Monochrome", a finishing option of "Stapled", and a delivery option of "Express Delivery", as illustrated in FIG. 6.

Customer 14, however, may select additional subfields or options or unselect selected subfields or options such that at least one option is selected for each advanced input field 160. Thus, customer 14 can select multiple options within one or more advanced input fields 160 for a comparison of such options with respect to quality, cost, and/or due date.

It is to be understood that FIGS. 4 and 6 are simplified illustrations of one exemplary embodiment of customer interface 24. The illustrative presentation of input fields 60 and 160 including the respective subfields, for example, has been simplified for clarity of the invention. The subfields may be presented, for example, as open fields, pulldown menus, toggle selections, and/or highlighted or framed selections. In addition, customer interface 24 may be presented, for example, in one or more screens or views. Furthermore, customer 14 may generate print request 42 by responding to query-based systems or applications. It is understood that such alternatives are within the scope of the present invention.

Figure 7:
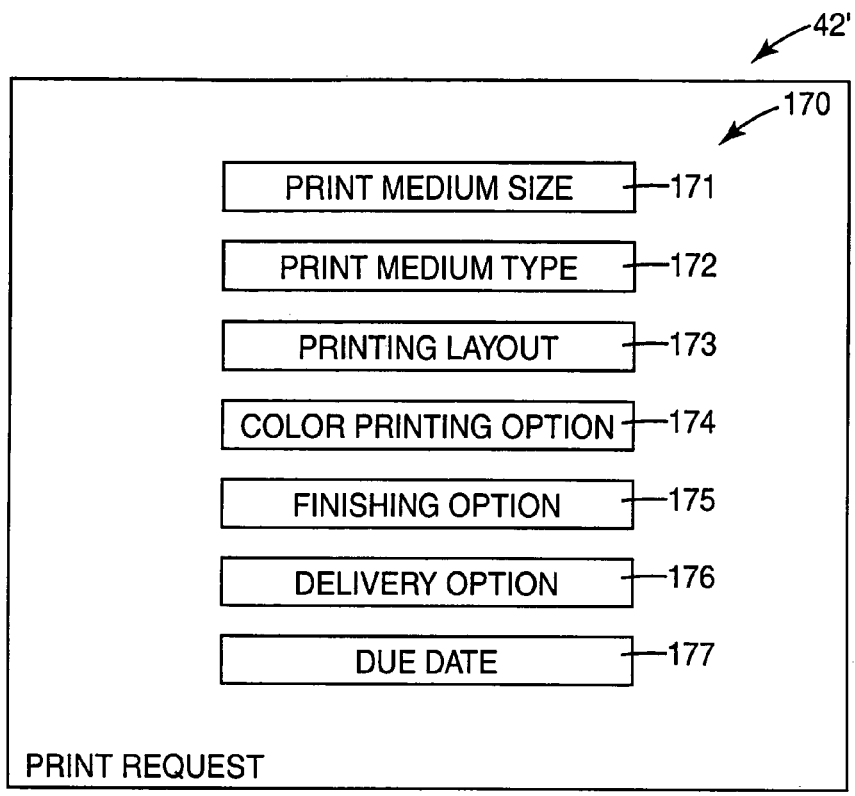
FIG. 7 is a diagram illustrating another exemplary embodiment of a print request generated and submitted by a customer with the print processing system of FIG. 1.

By interacting with advanced input fields 160 of customer interface 24, customer 14 generates an expanded print request 42' for print job 12. In one exemplary embodiment, as illustrated in FIG. 7, expanded print request 42' includes a plurality of additional print request attributes 170 which further define print job 12. Additional print request attributes 170 include, for example, a print medium size attribute 171, a print medium type attribute 172, a printing layout attribute 173, a color printing option attribute 174, a finishing option attribute 175, a delivery option attribute 176, and a due date attribute 177. Additional print request attributes 170 coincide with selections as specified in advanced input fields 160 of customer interface 24. Customer 14 generates and submits print request 42' to print processing system controller 28 in a manner similar to that described above with respect to print request 42. Reference herein to print request 42, therefore, is also applicable to print request 42'.

If customer 14 does not specify additional attributes of print job 12 with advanced input fields 160, print medium size and type, and printing layout, color printing, finishing, and delivery options are automatically selected by print processing system controller 28. Print processing system controller 28 automatically selects such additional attributes based on data file 38 and print request 42 for print job 12 and printing capability 46 of print providers 22. In one exemplary embodiment, print processing system controller 28 also considers expert and/or affinity information on print services 18 and print jobs 12.

In one exemplary embodiment, print provider interface 26 includes a plurality of input fields with which print provider 16 interacts, via an input device such as a keyboard and/or a mouse of computer terminal 44, to register printing capability 46. Print provider 16 registers printing capability 46 with print processing system controller 28 in a manner similar to how customer 14 generates and submits print request 42 to print processing system controller 28. An example of print provider interface 26 is described in detail in U.S. patent application, assigned to the assignee of the present invention and incorporated herein by reference.

Figure 8:
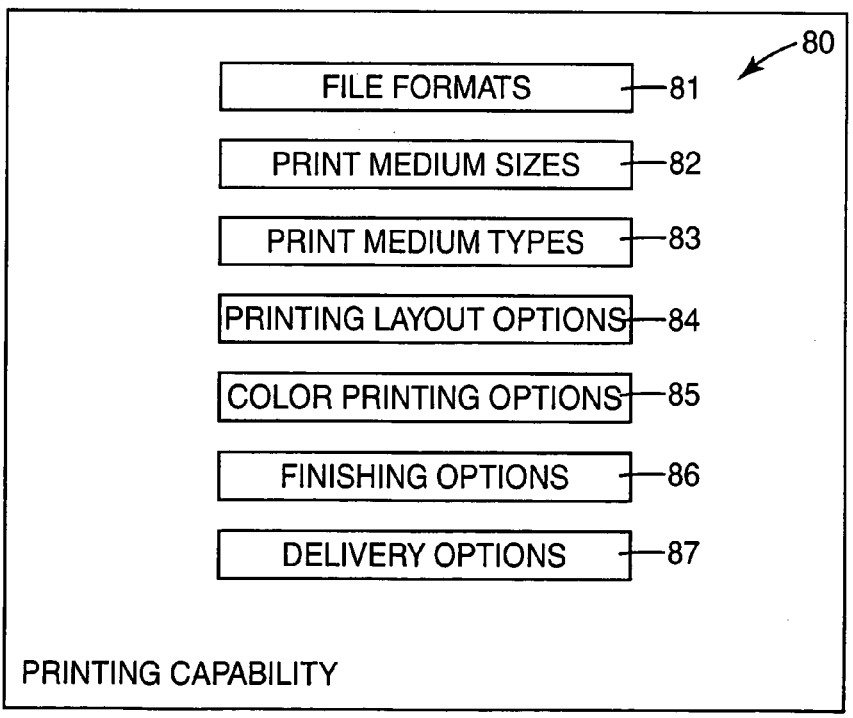
FIG. 8 is a diagram illustrating one exemplary embodiment of a printing capability registered by a print provider with the print processing system of FIG. 1.

In one exemplary embodiment, as illustrated in FIG. 8, printing capability 46 includes a plurality of printing capability attributes 80 which define print services 18. Printing capability attributes 80, include, for example, a file formats attribute 81, a print medium sizes attribute 82, a print medium types attribute 83, a printing layout options attribute 84, a color printing options attribute 85, a finishing options attribute 86, and a delivery options attribute 87. Printing capability attributes 80 coincide with selections as specified in input fields of print provider interface 26 in a manner similar to how print request attributes 70 and/or 170 coincide with selections as specified in input fields 60 and/or 160 of customer interface 24.

Printing capability attributes 80 identify the capabilities of print services 18 offered by print provider 16. More specifically, file formats attribute 81 identifies different file formats that print provider 16 supports and, more specifically, file formats from which print provider 16 is capable of printing. Print medium sizes attribute 82 identifies different sizes of print medium upon which print provider 16 is capable of printing. Print medium types attribute 83 identifies different types of print medium upon which print provider 16 is capable of printing. Printing layout options attribute 84 identifies different printing layouts that print provider 16 is capable of providing as print services 18. Color printing options attribute 85 identifies different color printing options that print provider 16 is capable of offering as print services 18. Finishing options attribute 86 identifies different finishing options that print provider 16 is capable of providing as print services 18. Delivery options attribute 87 identifies different delivery options that print provider 16 is capable of providing as print services 18. It is understood that print provider 16 may offer multiple options for each attribute and that certain options may be specific to specific attributes. For example, print provider 16 may offer a specific print medium size or range of sizes per a specific print medium type.

As illustrated in FIG. 9, print processing system controller 28 compiles a list 52 of at least one quote 54 of at least one print provider 16 which has printing capability 46 to complete print job 12. Print processing system controller 28 determines which print providers 22 have printing capability 46 to fulfill print job 12, based on a comparison of print request 42 and data file 38 for print job 12 with printing capability 46 of print providers 22. In one exemplary embodiment, one or more quotes 54 are presented to customer 14 from print processing system controller 28 via Internet communication link 32, as illustrated in FIG. 2.

In one exemplary embodiment, list 52 includes a cost field 521, a print medium field 522, a color printing option field 523, a printing layout option field 524, a finishing option field 525, and/or a delivery date field 526. Each quote 54, therefore, specifies a cost, a print medium size and type, a color printing option, a printing layout option, a finishing option, and/or a delivery type and date for print job 12. It is understood that not all fields of list 52 need be completed for each quote 54 and that additional fields may be included in list 52. In addition, list 52 may include multiple quotes 54 per print provider 16 if a print provider can provide multiple options. By selecting multiple options within one or more advanced input fields 160, customer 14 receives multiple quotes 54 and, therefore, a comparison of such options with respect to cost and/or delivery.

In one exemplary embodiment, print processing system controller 28 automatically calculates a cost to complete print job 12 based on print request 42, data file 38, and print services cost 50 associated with printing capability 46. An example of such calculation is described in detail in U.S. patent application, assigned to the assignee of the present invention and incorporated herein by reference. It is also within the scope of the present invention for print processing system controller 28 to query print providers 22 of a cost to complete print job 12, as well as other attributes, as described in detail in U.S. patent application, assigned to the assignee of the present invention and incorporated herein by reference.

Figure 10:
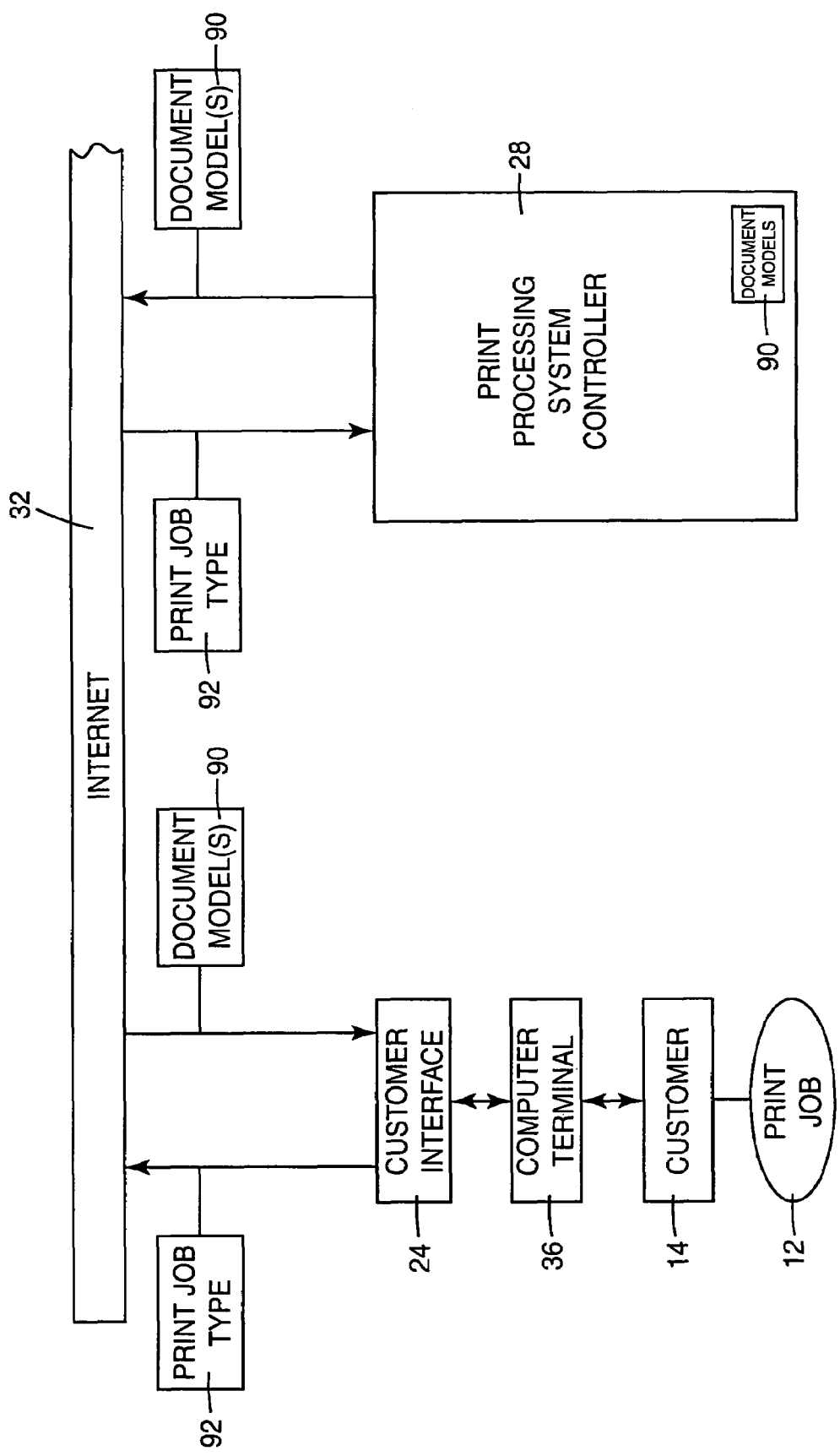
FIG. 10 is a block diagram illustrating another exemplary embodiment of information flow through a portion of the print processing system of FIG. 1.

To assist customer 14 in creating print job 12, print processing system controller 28 includes a plurality of document models 90, as illustrated in FIG. 10. In response to a print job type 92 submitted by customer 14, print processing system controller 28 compiles a set of document models 90 based on print job type 92. In one exemplary embodiment, print processing system controller 28 considers expert and/or affinity information according to print job type when compiling the set of document models 90.

To submit print job type 92 to print processing system controller 28, customer 14 interacts with customer interface 24 via computer terminal 36. Customer interface 24 can include, for example, subfields which represent different print job types. The subfields may be presented, for example, as open fields, pulldown menus, toggle selections, and/or highlighted or framed selections. In one exemplary embodiment, customer 14 submits print job type 92 to print processing system controller 28 via Internet communication link 32 and print processing system controller 28 presents document models 90 to customer 14 via Internet communication link 32. As such, customer 14 selects a document model 90 and creates print job 12 based on the selected document model 90. It is understood that the set of document models 90 presented to customer 14 may include one or more document models 90 depending on print job type 92 submitted by customer 14.

Figure 11:
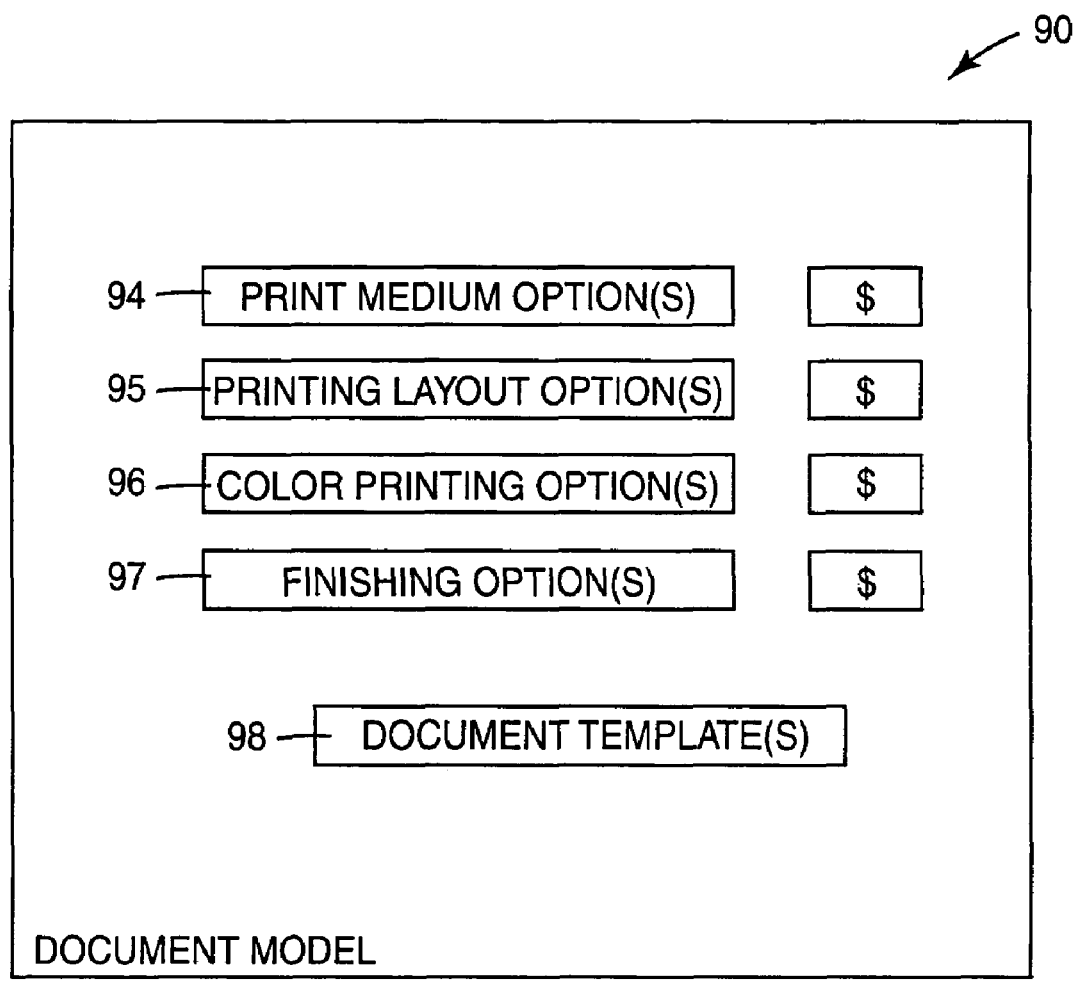
FIG. 11 is a diagram illustrating one exemplary embodiment of a document model included in the print processing system of FIG. 1.

In one exemplary embodiment, as illustrated in FIG. 11, each document model 90 includes, for example, a print medium option 94, a printing layout option 95, a color printing option 96, and/or a finishing option 97 for print job 12. Print medium option 94, printing layout option 95, color printing option 96, and finishing option 97 include a suggestion, based on print job type 92, for a print medium size and type, layout, color content, and finish, respectively, to be used to create print job 12. In addition, each print medium, printing layout, color printing, and/or finishing option includes an associated cost representative of different options. Furthermore, each document model 90 also includes a document template 98 for creating print job 12. Depending on print job type 92 submitted by customer 14, print medium option 94, printing layout option 95, color printing option 96, and/or finishing option 97 may include one or more respective suggestions or options for creating print job 12. In addition, document template 98 may included one or more document templates for creating print job 12.

In one exemplary embodiment, at least one document model 90 includes a pre-established document model. The pre-established document model includes a pre-established document type, a pre-established print medium size and type, and a pre-established printing layout, color printing, and finishing option for creating print job 12. As such, print provider 16 completes print job 12 for a pre-established price if customer 14 creates print job 12 per the pre-established document model.

Once print job 12 is created, customer 14 submits data file 38 and creates print request 42 for print job 12, as illustrated in FIG. 2 and described above.

Figure 12:
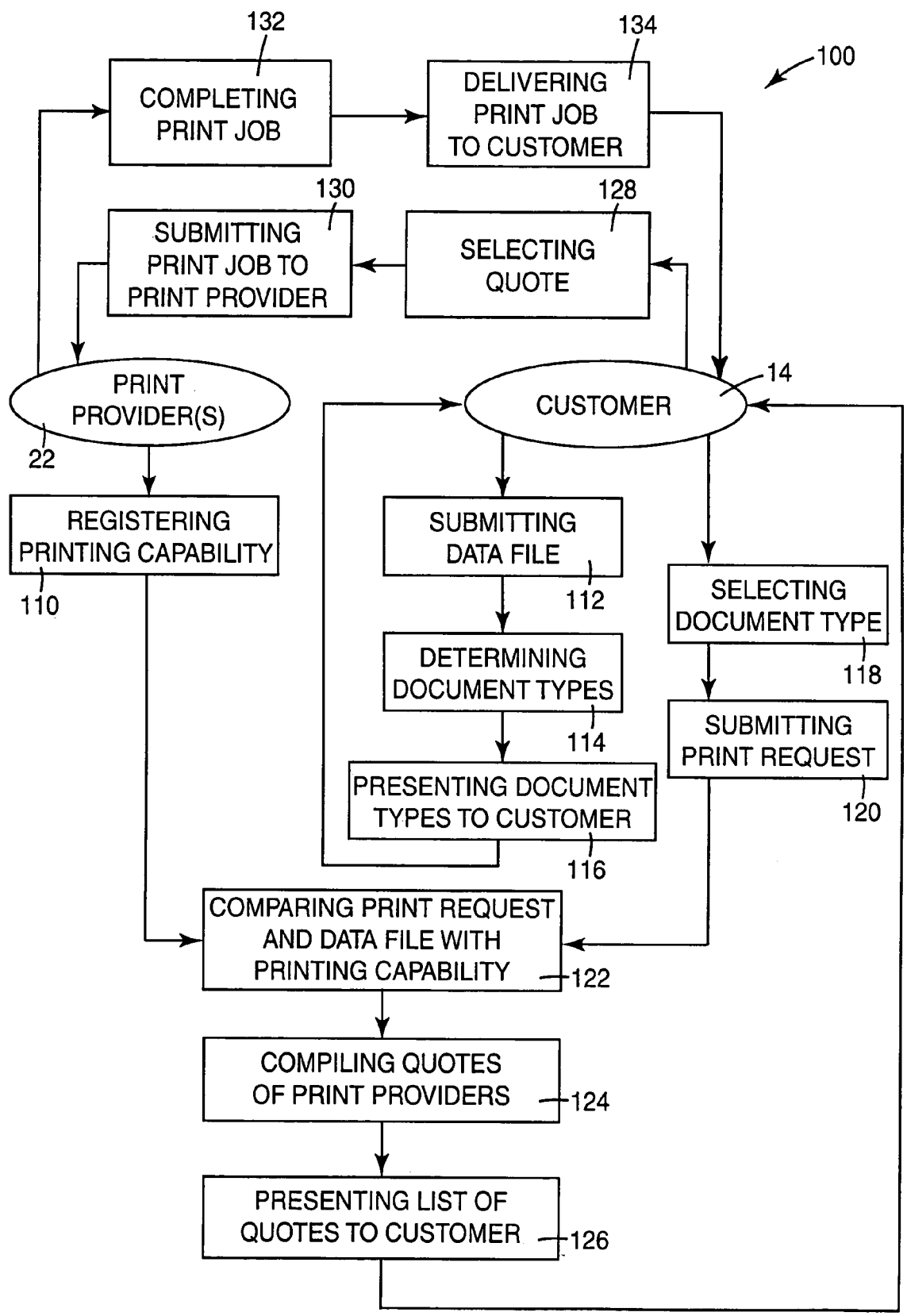
FIG. 12 is a flow diagram illustrating one exemplary embodiment of a method of processing a print job of a customer according to the present invention.

In FIG. 12, a flow diagram illustrating one exemplary embodiment of a method of processing print job 12 before submitting print job 12 to at least one print provider 16 according to the present invention is illustrated generally at 100. Reference is also made to FIGS. 1–11. At step 110, at least one print provider 16 of the plurality of print providers 22 registers a respective printing capability 46 for print services 18, including print services cost 50, with print processing system controller 28 and, at step 112, customer 14 submits data file 38 for print job 12 to print processing system controller 28. In one exemplary embodiment, customer 14 submits data file 38 to print processing system controller 28 via Internet communication link 32, as illustrated in FIG. 2, and print providers 22 register printing capability 46 with print processing system controller 28 via Internet communication link 32, as illustrated in FIG. 3.

Next, in step 114, after print processing system controller 28 receives data file 38, print processing system controller 28 determines document type 40 for print job 12. To determine document type 40 for print job 12, data file 38 is processed and characteristics of print job 12 such as a file format, a number of pages, a print medium, a printing layout, a color content, and/or an image presence of print job 12 are determined, as described above. In one exemplary embodiment, print processing system controller 28 analyzes such characteristics in association with expert and/or affinity information, as described above.

Next, in step 116, print processing system controller 28 presents document type 40 to customer 14. In one exemplary embodiment, one or more document types 40 are presented to customer 14 via Internet communication link 32, as illustrated in FIG. 2. Document types 40 are presented, for example, to customer 14 in the form of a list or icons.

Next, in step 118, customer 14 selects one document type 40 for print job 12 and, in step 120, generates and submits print request 42 to print processing system controller 28. More specifically, customer 14 selects document type 40 for print job 12 from one or more document types 40, as presented to customer 14 in step 116, and identifies quality, cost, and due date characteristics for print job 12. In one exemplary embodiment, customer 14 generates and submits print request 42' to print processing system controller 28. As such, customer 14 accepts print medium size and type, printing layout, color printing, finishing, and/or delivery options for print job 12 as determined by print processing system controller 28. Alternatively, customer 14 modifies the options for print job 12 as determined by print processing system controller 28 and specifies print medium size and type, printing layout, color printing, finishing, and/or delivery options for print job 12, as described above. In one exemplary embodiment, customer 14 generates and submits print request 42, including print request 42', to print processing system controller 28 via Internet communication link 32, as illustrated in FIG. 2.

Next, in step 122, after print processing system controller 28 receives print request 42, print processing system controller 28 compares data file 38 and print request 42 of print job 12 with printing capability 46 of print providers 22 to determine which print providers 22 have printing capability 46 to fulfill print job 12. To compare data file 38 and print request 42 with printing capability 46, print request attributes 70, including print request attributes 170, of print job 12, as specified by customer 14, are compared with printing capability attributes 80 of print services 18, as registered by print providers 22. Thus, print providers 22 having printing capability 46 to fulfill print request 42 and, therefore, complete print job 12 are determined. Accordingly, only those print providers 22 which have printing capability 46 to fulfill print request 42 are identified in step 122.

When printing capability 46 of print providers 22 is registered with print processing system controller 28 in step 110, print processing system controller 28 stores printing capability 46 in print processing data storage system 34, as described above. As such, print processing system controller 28 retrieves printing capability 46 from print processing data storage system 34 when comparing data file 38 and print request 42 with printing capability 46 in step 122.

Next, in step 124, list 52 of quotes 54 by print providers 22 which have printing capability 46 to fulfill print request 42, as established by print processing system controller 28 in step 122, is compiled. In one exemplary embodiment, quote 54 includes a cost, a print medium size and type, a color printing option, a printing layout option, a finishing option, and/or a delivery type and date for print job 12, as illustrated in FIG. 9 and described above.

Next, in step 126, list 52 of quotes 54, as compiled by print processing system controller 28 in step 124, is presented to customer 14. In one exemplary embodiment, one or more quotes 54 are presented to customer 14 from print processing system controller 28 via Internet communication link 32, as illustrated in FIG. 2.

Next, in step 128, customer 14 selects at least one quote 54 from list 52 and, therefore, at least one print provider 16 to complete print job 12. Next, in step 130, customer 14 initiates submission of print job 12 to the selected print provider 16. As such, print job 12, including data file 38 and print request 42, are submitted to print provider 16 from print processing system controller 28. In one exemplary embodiment, print job 12 is submitted to print provider 16 via Internet communication link 32.

Then, in step 132, the selected print provider 16 completes print job 12 and, in step 134, delivers completed print job 12 to customer 14. Delivery of completed print job 12 to customer 14 from print provider 16 is also represented by the dashed line in FIG. 1.

Figure 13:
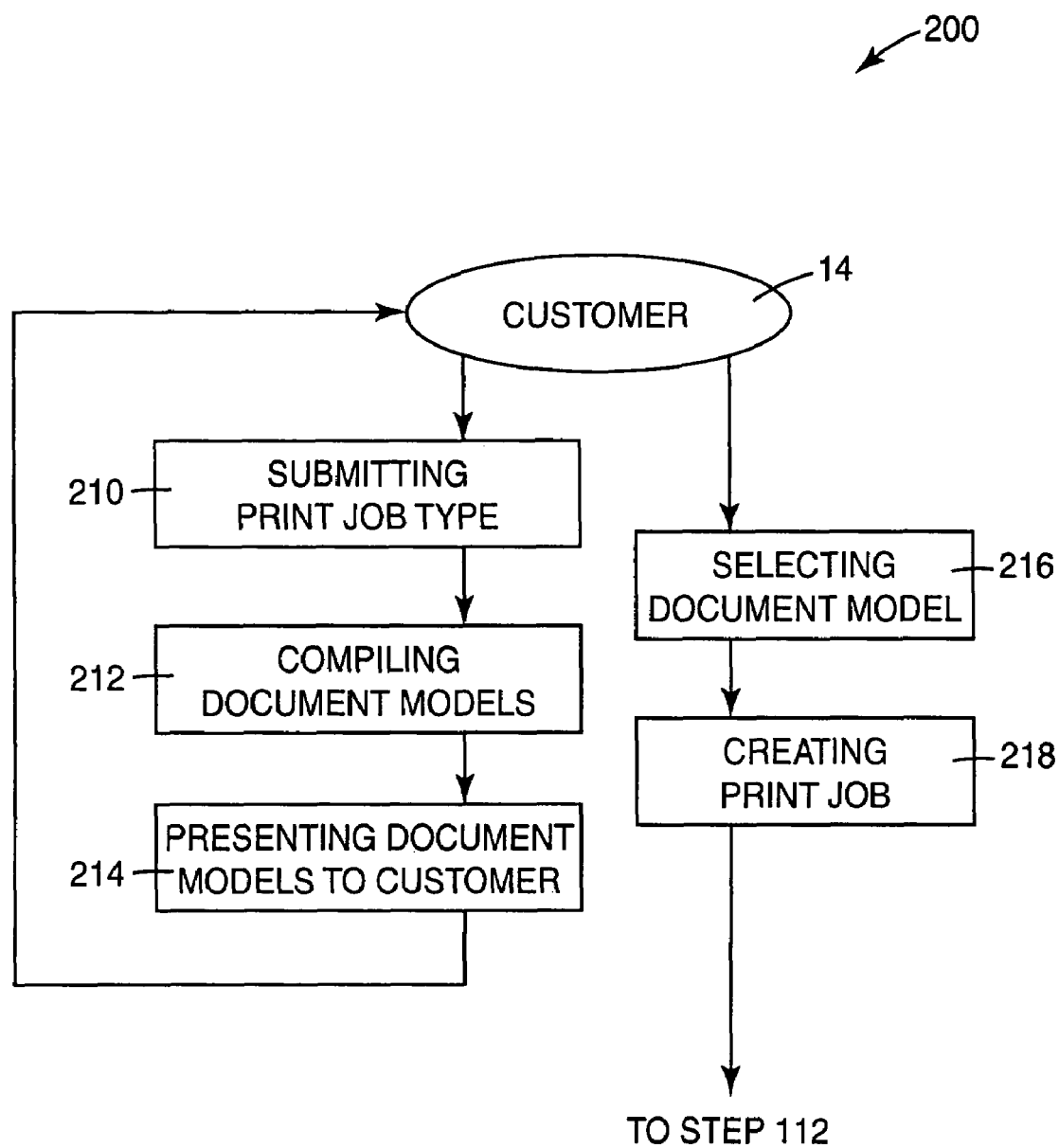
FIG. 13 is a flow diagram illustrating one exemplary embodiment of a method of creating a print job according to the present invention.

In FIG. 13, a flow diagram illustrating a method of creating print job 12 and, therefore, data file 38 for print job 12 before submitting data file 38 to print processing system controller 28 in step 112 is illustrated generally at 200. At step 210, customer 14 submits print job type 92 to print processing system controller 28. In one exemplary embodiment, customer 14 submits print job type 92 to print processing system controller 28 via Internet communication link 32, as illustrated in FIG. 10.

Next, in step 212, print processing system controller 28 compiles document models 90 based on print job type 92, as submitted by customer 14 in step 210, and, in step 214, presents document models 90 to customer 14. In one exemplary embodiment, one or more document models 90 are presented to customer 14 via Internet communication link 32, as illustrated in FIG. 10.

Next, in step 216, customer 14 selects one document model 90 to create print job 12 and, in step 218, creates print job 12. Customer 14 creates print job 12 by selecting, for example, a print medium, a printing layout option, a color printing option, and a finishing option for print job 12 from document model 90, as described above. In addition, customer 14 can also use document template 98 to create print job 12.

Thereafter, customer 14 submits data file 38 for print job 12, as created in steps 210 through 218, to print processing system controller 28 in step 112, as described above.

By determining document type 40 for print job 12, print processing system 10 assists customer 14 in generating print request 42 for print job 12. In addition, print processing system 10 permits customer 14 to specify quality, cost, and/or due date characteristics of print job 12 when generating print request 42. As such, print processing system controller 28 automatically selects a number of attributes of print job 12 based on print request 42 and, therefore, data file 38, document type 40, and quality, cost, and/or due date characteristics of print job 12. Thus, print processing system 10 advises customer 14 of how best to realize desired quality, cost, and/or due date goals or restrictions of print job 12.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of processing a print job of a customer before submitting the print job to at least one of a plurality of print providers, the print job being defined by a data file for the print job and a print request identifying at least one attribute of the print job as specified by the customer, the method comprising:

providing a print processing system controller having a printing capability of the print providers registered therewith;

defining a network communication link between the customer and the print processing system controller;

receiving the data file for the print job at the print processing system controller via the network communication link;

determining at least one document type for the print job with the print processing system controller based on characteristics of the print job as included in the data file for the print job, including processing the data file for the print job to determine characteristics of the print job including at least one of a file format, a number of pages, a print medium, a printing layout, a color content, and an image presence of the print job, and analyzing the characteristics of the print job to determine the at least one document type for the print job;

presenting the at least one document type for the print job to the customer via the network communication link; and receiving the print request for the print job at the print processing system controller via the network communication link, the print request specifying a document type for the print job from the at least one document type for the print job and identifying the at least one attribute of the print job as specified by the customer.

2. The method of claim 1, wherein defining the network communication link includes defining an Internet communication link between the customer and the print processing system controller.

3. The method of claim 1, wherein identifying the at least one attribute of the print job includes specifying at least one of a number of copies, a cost characteristic, a quality characteristic, and a due date characteristic for the print job.

4. The method of claim 1, wherein identifying the at least one attribute of the print job includes specifying at least one of a print medium, a printing layout, a color printing option, a finishing option, a delivery option, and a due date for the print job.

5. The method of claim 4, wherein identifying the at least one attribute of the print job includes specifying a plurality of selections for the at least one of the print medium, the printing layout, the color printing option, the finishing option, the delivery option, and the due date for the print job.

6. The method of claim 1, further comprising:

determining with the print processing system controller which of the print providers have the printing capability to fulfill the print job, including comparing the print request and the data file for the print job with the printing capability of the print providers;

compiling with the print processing system controller a list of at least one quote of at least one of the print providers which has the printing capability to fulfill the print job; and presenting the list of the at least one quote to the customer via the network communication link.

7. The method of claim 6, wherein the list of the at least one quote includes at least two quotes of the at least one of the print providers.

8. The method of claim 6, wherein defining the network communication link includes defining the network communication link between the customer, the print providers, and the print processing system controller, and further comprising:

selecting a quote from the list of the at least one quote and at least one print provider of the at least one of the print providers to fulfill the print job; and submitting the print job to the at least one print provider via the network communication link.

9. The method of claim 1, wherein the print processing system controller has a plurality of document models included therein, and further comprising:

creating the print job from a document model of the plurality of document models.

10. The method of claim 9, wherein creating the print job includes:

receiving a print job type at the print processing system controller, compiling with the print processing system controller a set of document models from the plurality of document models based on the print job type, the set of document models including the document model of the plurality of document models, and presenting the set of document models to the customer via the network communication link.

11. The method of claim 10, wherein creating the print job further includes selecting the document model from the set of document models.

12. The method of claim 9, wherein creating the print job includes selecting at least one of a print medium, a printing layout, a color printing option, and a finishing option for the print job from the document model.

13. The method of claim 12, wherein creating the print job further includes presenting a cost for each of the at least one of the print medium, the printing layout, the color printing option, and the finishing option for the print job to the customer via the network communication link.

14. The method of claim 9, wherein creating the print job includes selecting a document template for the print job from the document model.

15. The method of claim 1, wherein defining the network communication link includes defining the network communication link between the customer, the print providers, and the print processing system controller, and further comprising:
   registering the print capability of each of the print providers with the print processing system controller via the network communication link.

16. The method of claim 15, wherein registering the printing capability includes registering at least one of a file format compatibility, a print medium capability, a printing layout capability, a color printing capability, a finishing capability, and a delivery capability of each of the print providers.

17. A system for processing a print job of a customer before submitting the print job to at least one of a plurality of print providers, the print job being defined by a data file for the print job and a print request identifying at least one attribute of the print job as specified by the customer, the system comprising:
   a print processing system controller configured to have a printing capability of the print providers registered therewith,
   wherein the print processing system controller is adapted to receive the data file for the print job from the customer, process the data file for the print job to determine characteristics of the print job including at least one of a file format, a number of pages, a print medium, a printing layout, a color content, and an image presence of the print job, and analyze the characteristics of the print job to determine at least one document type for the print job based on the characteristics of the print job as included in the data file for the print job, and
   wherein the print processing system controller is adapted to present the at least one document type for the print job to the customer, and receive the print request for the print job from the customer, wherein the print request specifies a document type for the print job from the at least one document type for the print job and identifies the at least one attribute of the print job as specified by the customer.

18. The system of claim 17, wherein the print processing system controller is configured to communicate with the customer via a network communication link, and wherein the print processing system controller is adapted to receive the data file for the print job from the customer via the network communication link.

19. The system of claim 18, wherein the network communication link is an Internet communication link.

20. The system of claim 17, wherein the at least one attribute of the print job includes at least one of a number of copies, a cost characteristic, a quality characteristic, and a due date characteristic for the print job.

21. The system of claim 17, wherein the at least one attribute of the print job includes at least one of a print medium, a printing layout, a color printing option, a finishing option, a delivery option, and a due date for the print job.

22. The system of claim 21, wherein the at least one attribute of the print job includes a plurality of selections for the at least one of the print medium, the printing layout, the color printing option, the finishing option, the delivery option, and the due date for the print job.

23. The system of claim 18, wherein the print processing system controller is adapted to compare the print request and the data file for the print job with the printing capability of the print providers and determine which of the print providers have the printing capability to fulfill the print job, compile a list of at least one quote of at least one of the print providers which has the printing capability to fulfill the print job, and present the list of the at least one quote to the customer via the network communication link.

24. The system of claim 23, wherein the list of the at least one quote includes at least two quotes of the at least one of the print providers.

25. The system of claim 23, wherein the network communication link is an Internet communication link.

26. The system of claim 17, wherein the print processing system controller has a plurality of document models included therein, and wherein the print job is created from a document model of the plurality of document models.

27. The system of claim 26, wherein the prim processing system controller is adapted to receive a print job type, compile a set of document models from the plurality of document models based on the print job type, and present the set of document models to the customer via a network communication link, the set of document models including the document model of the plurality of document models.

28. The system of claim 26, wherein the network communication link is an Internet communication link.

29. The system of claim 26, wherein each of the document models include at least one of a print medium option, a printing layout option, a color printing option, and a finishing option for the print job.

30. The system of claim 29, wherein each of the document models include a cost for each of the at least one of the print medium option, the printing layout option, the color printing option, and the finishing option for the print job.

31. The system of claim 26, wherein each of the document models include at least one document template for the print job.

32. The system of claim 17, wherein the printing capability of each of the print providers is registered with the print processing system controller via a network communication link.

33. The system of claim 32, wherein the network communication link is an Internet communication link.

34. The system of claim 32, wherein the printing capability of each of the print providers includes at least one of a file format compatibility, a print medium capability, a printing layout capability, a color printing capability, a finishing capability, and a delivery capability.

* * * * *

UNITED STATES PATENT AND TRADEMARK OFFICE
CERTIFICATE OF CORRECTION

PATENT NO. : 7,239,408 B1  
APPLICATION NO. : 09/710287  
DATED : July 3, 2007  
INVENTOR(S) : Michael Dean Whitmarsh et al.

Page 1 of 1

It is certified that error appears in the above-identified patent and that said Letters Patent is hereby corrected as shown below:

In column 6, line 44, after "to" insert -- print --.

In column 16, line 29, in Claim 27, delete "prim" and insert -- print --, therefor.

Signed and Sealed this

Eleventh Day of August, 2009

David J. Kappos
*Director of the United States Patent and Trademark Office*